United States Patent [19]

Callahan et al.

[11] 4,071,282
[45] Jan. 31, 1978

[54] SLIP-SLIDE DETECTOR SYSTEM FOR RAILWAY CAR WHEELS

[75] Inventors: Bernard E. Callahan, Hoffman Estates; Edward A. Christianson, Niles, both of Ill.

[73] Assignee: Vapor Corporation, Chicago, Ill.

[21] Appl. No.: 655,199

[22] Filed: Feb. 4, 1976

[51] Int. Cl.² .......................... B60T 8/02; G01P 3/58
[52] U.S. Cl. .................................. 303/106; 180/82 R; 188/181 C; 303/96; 361/238; 324/166; 340/53
[58] Field of Search .............. 180/82 R, 82 D, 105 E; 188/181 C; 235/150.2, 150.24, 151.32; 246/182 B, 182 G; 303/20, 91, 95, 96, 97, 106; 307/233 B; 317/5, 6; 318/52; 324/161, 163, 166; 340/53, 62, 263; 361/236, 238, 229, 240

[56] References Cited

U.S. PATENT DOCUMENTS

| | | | |
|---|---|---|---|
| 3,482,887 | 12/1969 | Sheppard | 303/106 |
| 3,502,904 | 3/1970 | Bordonaro | 324/166 |
| 3,586,385 | 6/1971 | Florus et al. | 188/181 C UX |
| 3,608,978 | 9/1971 | Neisch | 188/181 C X |
| 3,620,577 | 11/1971 | Neisch et al. | 188/181 C X |
| 3,639,753 | 2/1972 | Reich | 246/182 C |
| 3,706,351 | 11/1971 | Neisch | 303/96 X |
| 3,714,509 | 6/1973 | Coleman et al. | 317/5 |
| 3,769,595 | 10/1973 | Ooya et al. | 188/181 C X |
| 3,891,046 | 6/1975 | Oicles | 180/105 E |
| 3,909,071 | 9/1975 | Klatt | 303/106 |
| 3,948,570 | 4/1976 | Fukumori et al. | 303/106 |

OTHER PUBLICATIONS

K. D. E. Crawford, "Electronic Control of Spin or Slide," Railway Gazette International, Apr., 1971, pp. 140-142.

Primary Examiner—Stephen G. Kunin
Attorney, Agent, or Firm—Francis J. Lidd

[57] ABSTRACT

The inventive system comprises a magnetic pulse generator mounted on each axle of a railroad car. The outputs from the resulting pulse generators are fed to a detector which compares the speeds of the axles. When wheel slip indicated by a pulse count difference between axles is encountered, the detector operates solenoid-operated dump valves to increase brake pressure on both axles of the slipping axle truck. When axle speed recovers to a non-slipping condition, the dump valves are reset and brake pressure is reduced. The detector circuitry is also able to detect wheel slide thus permitting corrective action. In addition to the above, the system includes provision to prevent synchronous sliding of all axles by sensing the rate of change of count.

9 Claims, 6 Drawing Figures

SLIP-SLIDE DETECTOR SYSTEM FOR RAILWAY CAR WHEELS

FIELD OF THE INVENTION

The present invention relates to speed detectors, and more particularly to a digital speed detection system for railroad vehicles which senses the occurrence of wheel slip and wheel slide.

BRIEF DESCRIPTION OF THE PRIOR ART

Both on rapid transit and main line railways, operating safety, passenger comfort, and equipment life require that braking systems work as closely as possible to the limit of adhesion. When this is done, efficient control of wheel slip under traction or wheel slide when braking is essential to avoid damage to train or track. In recent years increasing adhesion demand, resulting from higher specified brake rates, has led to increasing utilization of wheel slip protection equipment. To be effective, the equipment must be able to detect a wheel slip condition and control brake applications to correct the condition in a minimum of time.

The prior art approaches have generally included an analog signal for speed detection and wheel slip and slide correction. One example is disclosed in U.S. Pat. No. 3,867,647 to the present assignee. Although the system set forth in this mentioned patent operates satisfactorily, digital or discrete control approaches provide operating advantages such as noise immunity, and improved response.

BRIEF DESCRIPTION OF THE PRESENT INVENTION

The present invention utilizes digital counters which compare rotation from separate axles and has as its major novelty a variable time base since the number of counts occurs in a shorter interval at higher speeds, and conversely at a longer time interval with lower speeds. This provides automatic adjustment of response over the speed range. A typical transit car wheel/slide application involves control of two axle trucks per car, each truck having two solid axles. Although the axles can have a speed variation from one to the other and in this system is measured in that way, the braking is only controlled on a total truck basis. Therefore, if for example, a speed difference was detected between axles of the same truck, no action would be taken. However, should the difference between axles of the individual trucks be detected, the pneumatic brake cylinder controlling brake action of the sliding axle set would momentarily be emptied or dumped from the spinning axle set. Control of an individual truck basis is brought about by the location of air brake cylinders, which are arranged to have one cylinder per side of each truck. By virtue of detecting slip and slide conditions through measuring and comparing wheel rotation during successive intervals, a greater precision in conforming to brake system dynamics may be realized which provides a superior detection system.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
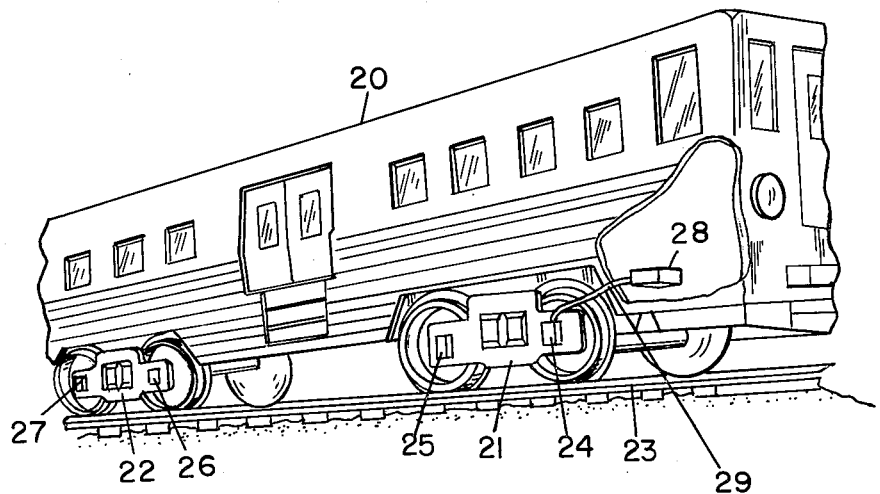
FIG. 1 is a perspective view of a portion of a rapid transit car incorporating a speed detector constructed in accordance with the invention.

Referring to the figures and more particularly to FIG. 1 thereof, a rapid transit car 20 of conventional design is seen to have front and rear dual axle trucks 21 and 22, respectively, which may each contain one or more traction motors (not shown) for driving the car along a track 23. Conventional electromagnetic pick-ups 24, 25, 26 and 27 are provided on respective axles to generate output signals in the form of series pulses at a rate dependent upon the rotation of respective axles. Pick-up signals are fed, through shielded cables, such as 29, to a cabinet 28 located in the car where the signals are processed. Although not shown, it is to be understood that shielded cables such as 29 are connected between the pick-ups 24, 25, 26 and 27 to the cabinet 28. Each of the pick-ups 24–27 is mounted in such a way as to pick up magnetic flux variations caused by passing gear teeth of the traction motor pinion or countershaft drive gear, if double reduction gearing is used or, on a special housing, if single reduction gearing is used. Each pick-up is so arranged as to count many pulses per wheel revolution, and its low level output is sent to the cabinet 28.

Figure 2:
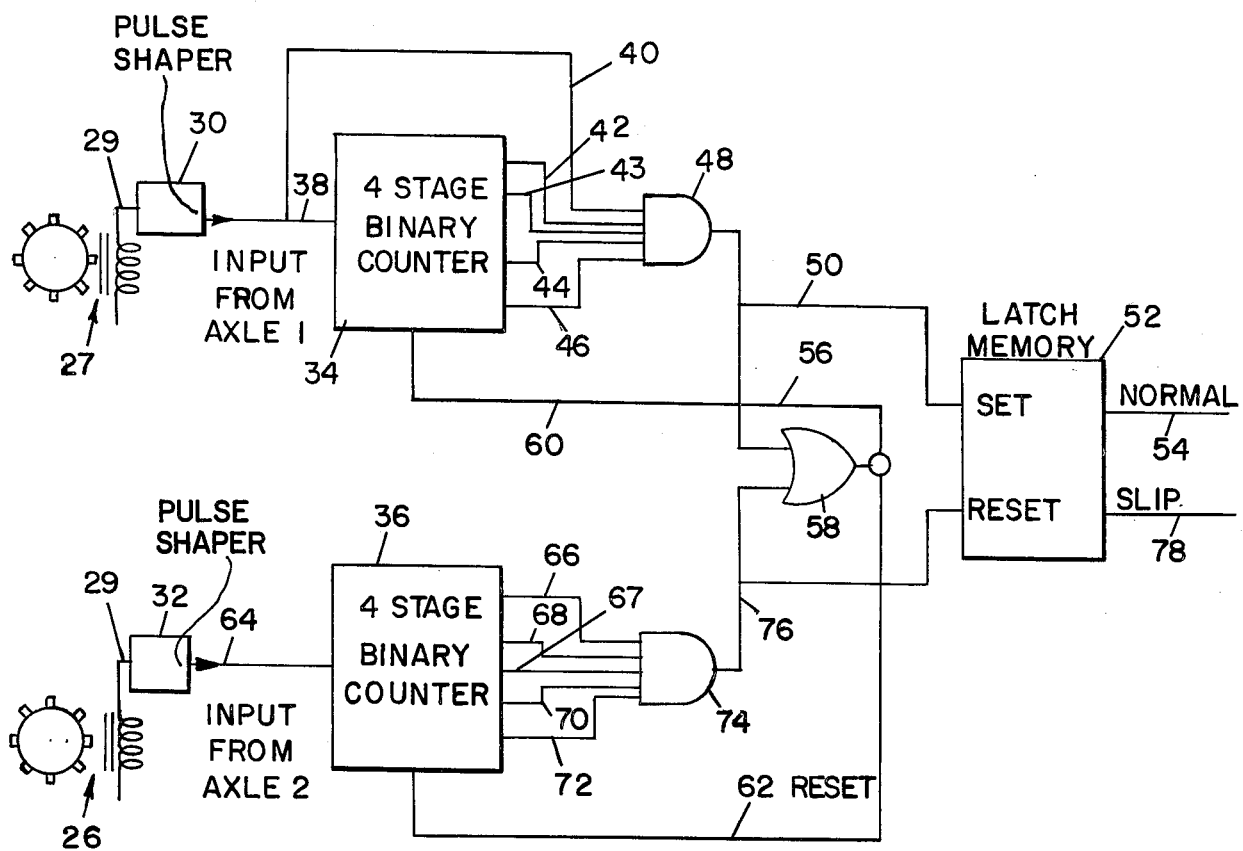
FIG. 2 is a logic diagram of a basic detector circuit as utilized in the present invention.

FIG. 2 illustrates a logic diagram for a basic slip detector. Referring to the figure, signals coming from electromagnetic picks-ups 26 and 27 are transmitted along shielded cables 29 to respective conventional circuits 30 and 32 which shape and amplify pulses from the electromagnetic pick-ups 27 and 26. The pulses from the circuits 30 and 32 are fed to a basic detector comprising two binary counters 34 and 36, three gates 48, 58, 74 and a latch memory 52.

The signals originating at the electromagnetic pick-up 27 are fed along lead 38 to the input of the counter 34 which may typically be a conventional fourstage binary counter. The counter is particularly suited to count the pulses as they are generated from the pick-up 27. The output leads from the counter 34 are connected to the input of an AND gate 48. In an evaluated embodiment of the invention, the AND gate 48 turns on when the four output leads 42, 43, 44 and 46 carry outputs thereon, indicative of a binary count of 60. An additional input 40 to the gate 48 is directly connected to lead 38, circumventing the counter 34, for synchronizing the gate 48 with the input from axle 1. The resulting signal from gate 48 goes simultaneously to gate 58 and along lead 50 to the Set terminal of a latch memory 52. The latch memory may be a D type flip-flop. An output along the "Normal" lead 54 will result. The output from gate 58 which was energized by gate 48 will turn on and send a reset signal to both counters 34 and 36, along input lines 60 and 62. The resetting of these counters will turn off gates 48 and 58.

During the time that axle 1 counter 34 was counting 60 pulses, the axle 2 counter 36, in absence of wheel slip, should have been doing the same. Axle 2 counter 36, however, is connected to gate 74 in such a way that after 62 pulses are received it will turn on gate 74. The output from gate 74 sends simultaneous signals to gate 58, along lead 76, as well as to the Reset terminal of latch memory 52. This will cause the latch memory 52 to reset and create an output along the "Slip" lead 78. Both counters 34 and 36 will be reset when the output from gate 58 actuates the Reset terminals of these counters, along input lines 60 and 62. Thus, gate 58 resets both counters as it would have done if it received its input signal from gate 48. While counts of 60 and 62 are used for the disclosed embodiment, it will be appreciated by those skilled in the art that other counts may be required for various operating conditions, vehicle wheel parameters and other system variables.

As long as the wheels of the railroad car are operating at the same speed, both counters 34 and 36 will reach the count of 60 at about the same time and gate 48 will keep the latch memory 52 set, and reset counter 34 before the axle 2 counter 36 can reach a count of 62. If on the other hand, axle 2 were to turn faster than axle 1 by more than a small amount, the axle 2 counter 36 would reach 62 and cause the latch memory 52 to reset and produce an indication of a wheel slip. This indication, of course, could be caused by a slide of axle 1 in braking.

The very basic detector as thus far described, is incapable of detecting the opposite condition, that is, a slide of axle 2. To accomplish this, it is necessary to provide another detector exactly like that shown in FIG. 2, except having axle 2 connected to counter 34 and axle 1 connected to counter 36, as opposed to the axle connections as shown in FIG. 2.

Bearing in mind the desirability of detecting the occurrence of axle slide during braking, it should be appreciated that a system can be designed to accommodate the braking operation, which requires a total of four basic detector circuits to provide all the information necessary to accomplish the desired detection of slipping and sliding wheels on a four axle car.

Figure 3:
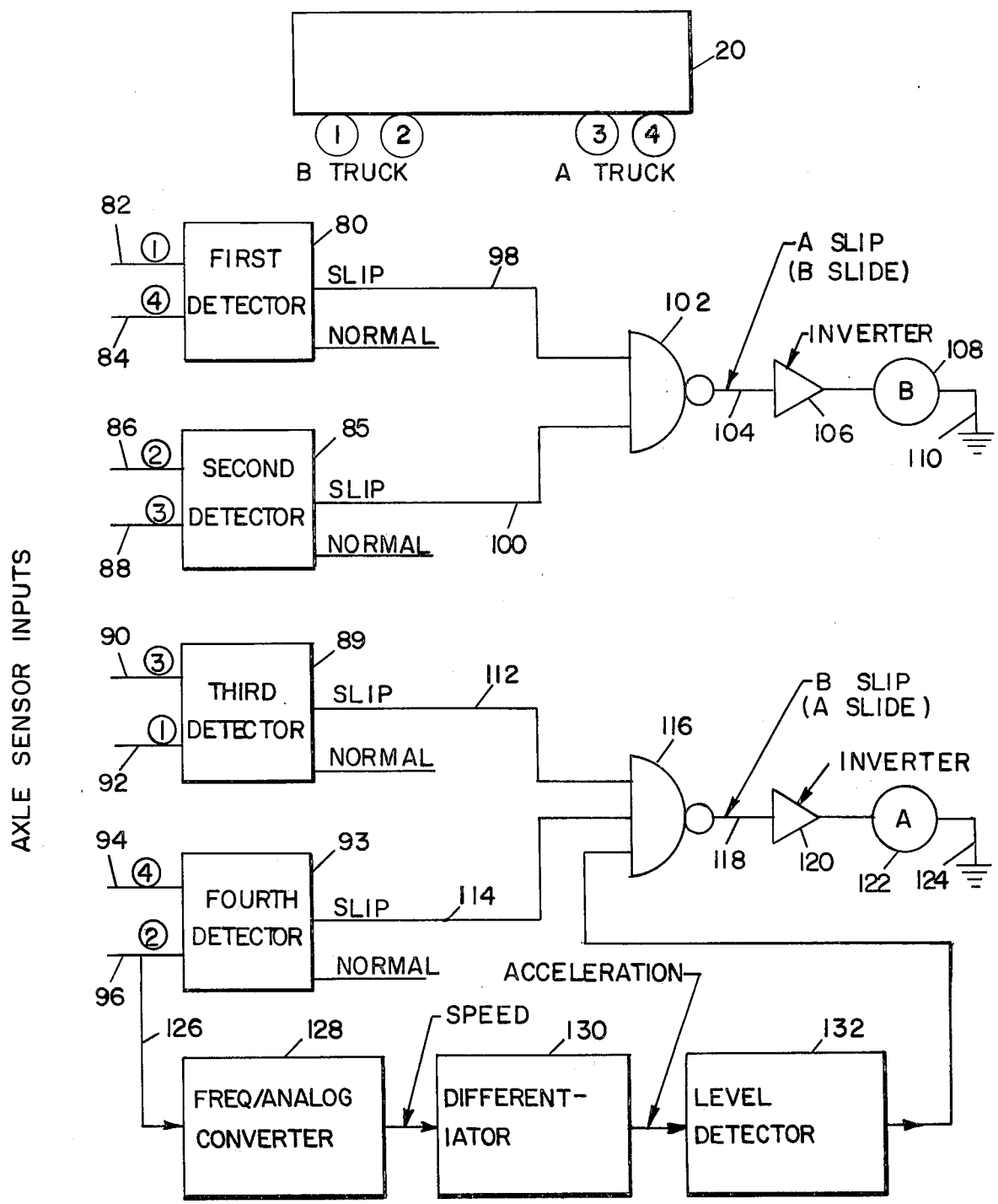
FIG. 3 is a logic diagram of the present invention as used in the detection of slip and slide.

FIG. 3 illustrates a system including four detectors for accomplishing this desired detection. The upper portion of the figure illustrates a transit car in diagrammatic form and indicated by reference numeral 20. The "B" Truck is shown to include axles 1 and 2 while the "A" Truck includes axles 3 and 4. Use of the system on vehicles having other wheel/axle configurations may require modifications of the axle/truck speed comparison method, as will be apparent to those skilled in the art.

Referring to FIG. 3, a logic diagram is shown, using the building blocks of FIG. 2, for detecting slip and slide of the axle trucks on a railway car. The diagrammatic illustration of transit car 20, at the top of FIG. 3, assumes a dual truck system, each truck having two axles mounted thereto. In order to establish complete slip and slide detection of the trucks, it is necessary to feed the various detectors with inputs from the first and second trucks as will be explained. The first detector 80 has a first input 82 that corresponds with the output from a sensor on axle 1. A second input 84 corresponds with a sensor output from the fourth axle. The second detector 85 is provided with sensor inputs from the second and third axles along input leads 86 and 88. The detectors 80 and 85 have "slip" outputs 98 and 100, respectively, for turning on the NAND gate 102 when a slip condition occurs at either the fourth or third axles. Otherwise stated, upon the occurrence of slip in truck "A", a detection of this condition is made. The "Normal" outputs from the detectors 80 and 85 may be used for monitoring purposes, but are not necessary for the detection of slip or slide.

In a similar manner the detectors 80 and 85 are capable of detecting the occurrence of a slide condition for the first or second axles. If one or both of these axles were to experience slide, outputs along lines 98 and 100 would turn on the NAND gate 102. Thus, the detectors 80 and 85 are capable of detecting a slide condition in truck "B". An inverter 106 is provided with the output from the NAND gate 102, on line 104, if a polarity reversal from the NAND gate is required. The inverter provides a pulse output to the relay 108, which is grounded at 110. Thus, when a slip occurs on the "A" Truck or if slide occurs on the "B" Truck, the relay 108 is actuated. As will be discussed in connection with FIG. 4, actuation of the relay signifies a positive detection of slip/slide and may be utilized by other circuits for correcting the traction motor and brake controls for the "A" Truck when in slip and the "B" Truck when in slide.

As will be appreciated, it is still necessary to detect slip in the "B" Truck and slide in the "A" Truck. In order to achieve this, third and fourth detectors 89 and 93 are employed. The sensor output from the third axle is provided along lead 90 to the detector 89 while the sensor from the first axle is provided along lead 92 to this detector. Upon the occurrence of slip from the first axle, an output is generated along the "slip" lead 112. Likewise, this lead will be energized if a slide condition occurs at the third axle. The fourth detector 93 has the output from the fourth axle sensor connected along lead 94 to the detector. The output from the second axle is provided along lead 96 to the detector. An output will occur from the detector 93 when a slip condition occurs at the second axle or a slide condition at the fourth axle. As in the case of gate 102, a second NAND gate 116 is provided with inputs from the detectors 89 and 93 to turn on gate 116 when a slip condition occurs on the "B" Truck or a slide condition on the "A" Truck. An output 118 from the NAND gate 116 is fed to the inverter 120 where a polarity reversal of the signal is desired. A second relay 122 is grounded at 124 and becomes energized upon the occurrence of an output from the NAND gate 116. As in the case of the previously mentioned relay 108, the relay 122 becomes energized upon the occurrence of slip in the "B" Truck and slide in the "A" Truck. Relay contact closure, as will be discussed in connection with FIG. 4, is used by utilization circuits, which do not form a part of the present invention, for controlling traction motor and braking controls.

While the detection system of FIG. 3 will operate to produce a slip/slide indication when any axle is rotating at a different speed from that of any other axle by more than a small preselected amount, there is always the possibility that all four wheels will slide simultaneously at synchronous speed. This possibility is accounted for by the acceleration detection apparatus shown on the bottom of FIG. 3. The purpose of the acceleration detection apparatus, to be explained shortly, is to measure the acceleration of one of the axles. If this axle should change its speed at a rate greater than a preselected number of miles per hour, this will cause the level detector to generate a slip/slide signal.

Specifically, the sensor output from the second axle is connected in parallel with the lead 96 and transmitted along lead 126 to a frequency-to-analog converter 128. The output from this converter represents the rotational velocity of the second axle. This is then differentiated in a conventional analog differentiation circuit 130 so that a signal indicative of acceleration may be derived. The output from the differentiation circuit 130 is fed to a level detection circuit 132 which only responds when the differentiated signal passes a selected threshold value. Thus, for example, an output may occur from the level detection circuit 132 if the second axle should change its speed at a rate greater than 8.0 mile per hour per second. Of course, this figure is merely exemplary. The output signal from the level detection circuit 132 is fed as a third input to gate 116 which energizes relay 122, as previously discussed. In the event that a deceleration of the illustrative 8.0 mphs occurs thus indicating a slide signal, the relay 122 may be used to cause the operation of an "A" Truck dump valve (not shown). As soon as the "A" Truck begins to correct its slide, the synchronism is broken and this will cause either detector 80 or 85 to have a "slip" output and operate relay 108. This relay may be connected to a "B" Truck dump valve (not shown) and the condition for both trucks will therefore be corrected.

Figure 4:
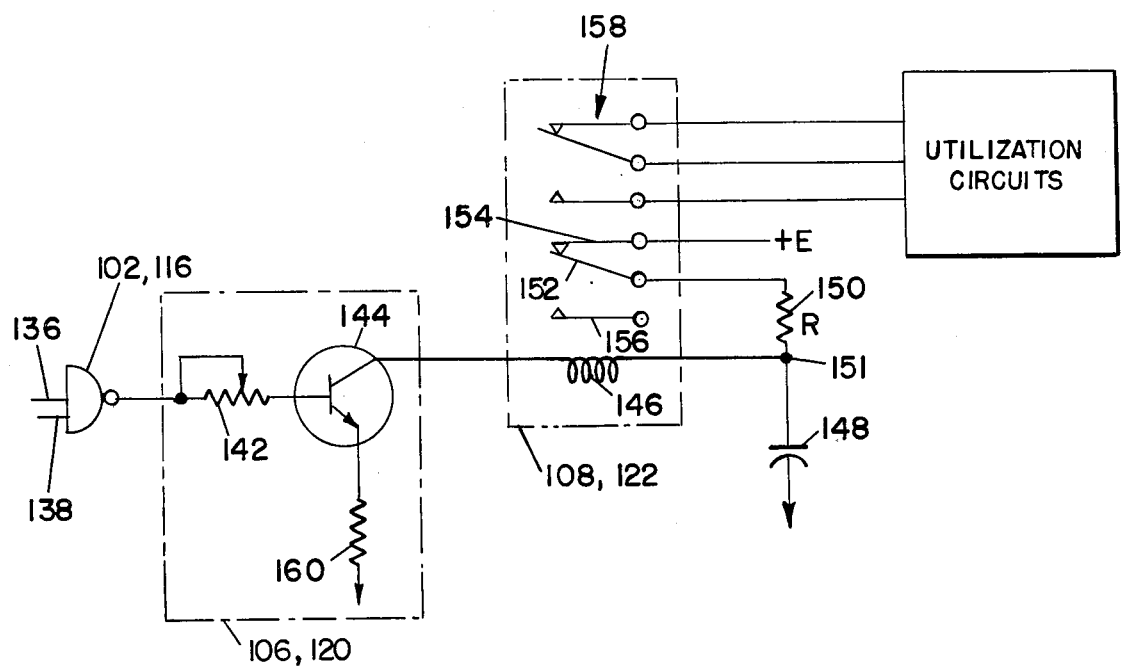
FIG. 4 is an electrical schematic diagram of an output portion of the invention illustrating with particularity the connection of a relay circuit with certain utilization circuits.

Several of the components of FIG. 3 are shown with particularity in FIG. 4; specifically, the circuitry incident to NAND gate 102, inverter 106 and relay 108 or gate 116, inverter 120 and relay 122. These components provide signal means for correcting spin-slide conditions and checking brake inhibit action. In particular, a signal is provided in the event that slip or slide indication continues for a prescribed time interval.

In FIG. 4 the initial NAND gate may be gate 102 or 116. The input leads to this gate are indicated by reference numerals 136 and 138 and represent the input leads to gates 102, 116 as illustrated in FIG. 3. Each inverter 106, 120 includes a variable resistor 142 which serves as a base resistor for the inverting transistor 144. The output of the transistor is connected to a relay which may be relay 108 or relay 122. The direct connection between the transistor 144 and the relay occurs through a coil 146 having an opposite terminal connected to the ungrounded terminal of a charging capacitor 148. The opposite end of the capacitor is grounded. A first set of relay contacts 158 is connected to utilization circuits which do not form a part of the present detector system invention. These utilization circuits may be brake control circuits for the car 20. Such circuits require the detection input from the present system along with information regarding the condition of traction motors and brakes so that ultimate control of the traction motors and brakes may be effected in accordance with the detected slip or slide condition. The relay coil 146 becomes energized upon the occurrence of an output from transistor 144. The relay associated with the coil will pick-up and hold in for a prescribed period of time determined by how long it takes the capacitor 148 to discharge below the hold-in voltage of the relay. A second set of contacts are provided in each of the relays 108, 122. These include the contacts 154, 156 and the movable contact 152. When contact is made between the relay contacts 152 and 154, a circuit path is completed between a potential +E, resistor 150 and capacitor 148. As long as transistor 144 is non-conducting, the capacitor can charge up to a voltage high enough to allow pick-up of the relays 108, 122 the next time there is an output from a respective inverter 106, 120. The capacitor will then discharge through the combined resistance of the relay coil 146, the transistor and the emitter resistor 160 until the drop in voltage at point 151 causes the coil 146 to release the relay contacts.

Figure 5:
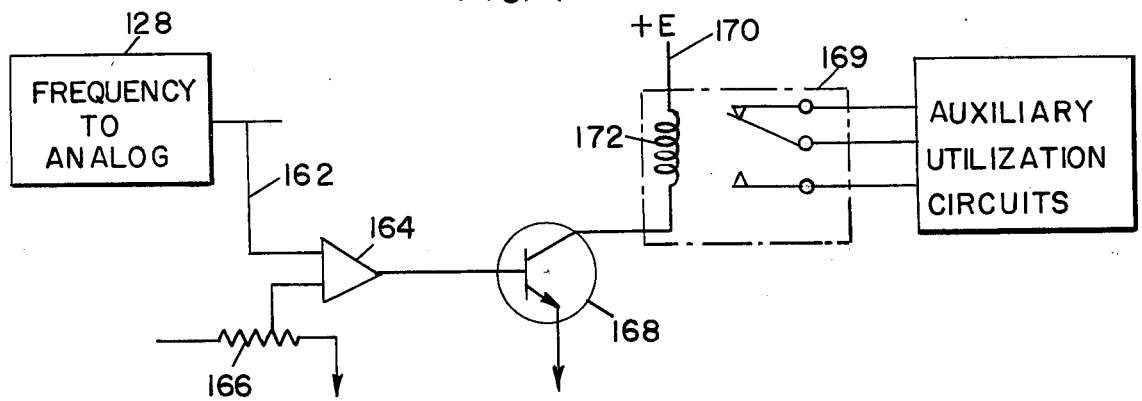
FIG. 5 is an electrical schematic diagram illustrating the utilization of a frequency-to-analog converter in controlling relay operation to auxiliary utilization circuits as may be employed with the present invention.

In the environment of the present invention, it may be desirable to input data to door circuits that indicates a railway car is either at a standstill or moving at an extremely low rate. To perform this function the output of the frequency-to-analog converter 128 (FIG. 3) is shown to transmit data to additional circuits in FIG. 5. In FIG. 5, the output from the frequency-to-analog converter 128 is fed along line 162 to a conventional zero-crossing detector. The zero-crossing detector 164 is adjusted by means of an adjustable resistor 166, connected to the input of the detector 164, to produce an output when the incoming voltage from the converter 128 falls below the voltage representing a very low rate of speed, for example 2 mph. The output from the detector is amplified by the transistor 168 which has its output connected to the coil 172 of a relay 169. A bias potential at 170 is connected to the free end of the coil for biasing the transistor 168. When the relay 169 changes state in response to relay actuation, auxiliary utilization circuits of the type mentioned, input data representing the very low rate of speed. However, as should be understood, the auxiliary utilization circuits do not form a part of the present invention, per se.

Figure 6:
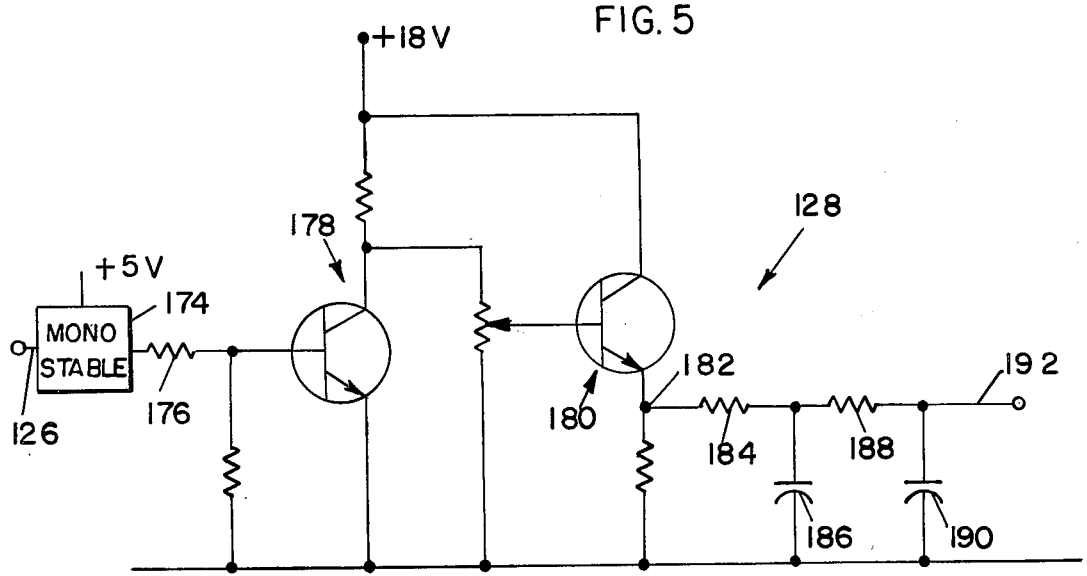
FIG. 6 is an electrical schematic diagram illustrating the particular circuit of a typical frequency-to-analog converter as utilized in the invention.

FIG. 6 is an electrical schematic showing the circuitry for the frequency-to-analog converter that has previously been shown and explained in connection with FIGS. 3 and 5.

Amplified and shaped pulses from the axle sensor appear on lead 126. The pulses serve as triggers to a monostable 174 which is typically the type provided by Texas Instruments in IC form and designated by the manufacturer as an SN 74121N chip. A relatively low potential is applied to the monostable, 5 example 5 volts. The output from the monostable will be a pulse train wherein each pulse, derived from a corresponding triggering pulse along lead 126, but having a constant pulse width. This pulse train is fed through input resistor 176 to a first transistor stage 178 which has its output coupled to a second transistor stage 180. The transistor stages 178 and 180 have a bias potential applied to them which is considerably higher than the bias potential used in connection with the monostable 174. For example, 18 volts are provided to 18 transistor stages 178 and 180 to boost the amplitude of the pulse train that is derived at the output of the monostable 174. The output from the transistor stage 180 occurs at the emitter terminal 182. The output, which is an amplitude boosted pulse train is processed through to sections of the RC filter including resistors 184, 188 and capacitors 186 and 190. The purpose of the two RC stages is to integrate the pulse train from the transistors 178, 182 thereby generating a DC level that is proportional to the number of pulses that were fed to the monostable at lead 126. In a physical sense, the number of pulses on lead 126 corresponds to the speed of a railway car so that the DC level present at output line 192 is proportional to the speed of the car. Of course, it will be appreciated that the frequency-to-analog converter illustrated in FIG. 6 is only one type of such converter that may be designed. Other circuits may be combined to function as an appropriate frequency-to-analog converter for the purposes of the present invention.

In summary, the present invention offers the advantage of a precise and accurate slip/slide detector system for railway cars that increases its sensitivity as the speed of the railway car wheels increases due to the increasing pulse rate from the car axle sensors. The increased sensitivity at higher speeds is particularly advantageous with modern higher operating speeds of railway cars. The present system is easily adapted to traction motor and brake control systems on railway cars. Further, the present system may be connected with such auxiliary utilization circuits as the door control circuits currently employed on railroad cars.

It should be understood that the invention is not limited to the exact details of construction shown and described herein for obvious modifications will occur to persons skilled in the art.

We claim the following:

1. In a vehicle having at least first and second axle trucks, each truck having at least two axles thereon, a slip/slide detection system comprising:
   first sensor means connected to a first axle on the first truck for generating digital signals indicative of the angular velocity of this axle;
   second sensor means connected to a second axle on the first truck for generating digital signals indicative of the angular velocity of this axle;
   third sensor means connected to a third axle on the second truck for generating digital signals indicative of the angular velocity of this axle;
   fourth sensor means connected to a fourth axle on the second truck for generating digital signals indicative of the angular velocity of this axle;
   first detecting means having its inputs connected to the outputs of the first sensor means and the fourth sensor means for detecting a preselected velocity difference between the first and fourth axles;
   second detecting means having its inputs connected to the outputs of the second sensor means and the third sensor means for detecting a predetermined velocity difference between the second and third axles;
   third detecting means having its inputs connected to the outputs of the third and first sensor means for detecting a preselected velocity difference between the third and first axles;
   fourth detecting means having its inputs connected to the outputs of the fourth and second sensor means for detecting a preselected velocity difference between the fourth and second axles;
   first gating means having inputs thereof connected to the outputs of the first and second detecting means for signifying a slip condition of the second truck or slide condition of the first truck;
   second gating means having inputs thereof connected to the outputs of the third and fourth detecting means for signifying a slip condition of the first truck or slide condition of the second truck.

2. The subject matter set forth in claim 1 together with additional means for detecting the occurrence of synchronous slide between axles of the first and second truck, the additional means comprising:
   converting means connected to the output of a preselected sensor means for developing a signal indicative of axle deceleration;
   level detecting means connected to the output of the converting means for detecting a minimum deceleration level; and
   means for connecting the output of the level detecting means to a preselected one of the gating means causing corrective action by the axles associated with that gating means, said corrective action being detected by the sensor means of the remaining axles thus causing their corrective action as well.

3. The subject matter set forth in claim 2 wherein the converting means comprises:
   a frequency-to-analog converter for generating analog signals indicative of axle speed; and
   means connected to the output of the converter for differentiating the output therefrom, indicative of axle deceleration.

4. The subject matter set forth in claim 3 wherein the frequency-to-analog converter comprises:
   a monostable for generating pulses of uniform width; and
   means connected in circuit with the output of the monostable for integrating the output therefrom thus creating an analog signal corresponding to axle speed.

5. The subject matter set forth in claim 4 together with means connected between the monostable output and input of the integrating means for boosting the amplitude of pulse signals delivered by the monostable.

6. The subject matter set forth in claim 5 wherein the integrating means comprises at least one section of resistor-capacitor components.

7. The subject matter set forth in claim 3 together with a system for auxiliary utilization circuits which detects the occurrence of a preselected speed range, this system comprising:
   a zero-crossover detector connected to the output of the frequency-to-analog converter for detecting the occurrence of the preselected speed range.

8. The subject matter of claim 1 further including means detecting slip or slide occurrences of a prescribed duration.

9. The subject matter set forth in claim 1 wherein each detecting means connected to the sensing means comprises:
   first counter means having its input connected in circuit with the first sensor means for generating an output signal in response to a first predetermined count;
   second counter means having its input connected in circuit with the second sensor means for generating an output signal in response to a second predetermined count higher than the first count;
   latch memory means having its first input connected to the output of the first counter means for setting the latch memory means in a first state indicative of the absence of wheel slip or slide;
   a second input of the latch memory means connected to the output of the second counter means for resetting the latch memory means to a second state indicative of a predetermined slip or slide condition; and
   gating means connected at its input to the outputs of the first and second counter means for resetting both counter means after the first count or second count has occurred.

* * * * *